US009832607B2

(12) United States Patent
Won

(10) Patent No.: US 9,832,607 B2
(45) Date of Patent: Nov. 28, 2017

(54) METHOD OF PROCESSING BEACON OF ELECTRONIC DEVICE AND ELECTRONIC DEVICE THEREOF

(71) Applicant: Samsung Electronics Co., Ltd., Gyeonggi-do (KR)

(72) Inventor: Sung-Wook Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 51 days.

(21) Appl. No.: 14/790,427

(22) Filed: Jul. 2, 2015

(65) Prior Publication Data

US 2016/0021500 A1    Jan. 21, 2016

(30) Foreign Application Priority Data

Jul. 16, 2014    (KR) .................... 10-2014-0089852

(51) Int. Cl.
*H04W 4/02*    (2009.01)
*H04W 40/24*    (2009.01)

(52) U.S. Cl.
CPC ......... *H04W 4/021* (2013.01); *H04W 40/244* (2013.01)

(58) Field of Classification Search
CPC ... H04W 4/021; H04W 40/244; H04W 88/02; H04W 36/12; H04W 36/18; H04W 60/04; G01S 5/0018; G01S 5/0236
See application file for complete search history.

(56) References Cited

U.S. PATENT DOCUMENTS

| RE42,927 E | 11/2011 | Want et al. |
| 9,078,098 B1 * | 7/2015 | Cronin ................. H04W 4/021 |
| 9,374,666 B1 * | 6/2016 | Trouw .................. H04W 4/025 |
| 2015/0348146 A1* | 12/2015 | Shanmugam et al. .......... 705/71 |
| 2015/0348334 A1* | 12/2015 | Ekselius et al. ................ 705/13 |
| 2015/0355308 A1* | 12/2015 | Ishida et al. ............... 455/456.1 |
| 2015/0365486 A1* | 12/2015 | Kotecha et al. ........... 455/414.1 |
| 2016/0007184 A1* | 1/2016 | Kulikov ................ G01S 5/0252 455/41.2 |
| 2016/0171486 A1* | 6/2016 | Wagner .................. G06Q 20/12 705/39 |
| 2017/0103377 A1* | 4/2017 | Jack .................... G06Q 20/3224 |
| 2017/0111872 A1* | 4/2017 | Moon ................. H04W 52/322 |

* cited by examiner

*Primary Examiner* — Hirdepal Singh
(74) *Attorney, Agent, or Firm* — The Farrell Law Firm, P.C.

(57) ABSTRACT

A method and an electronic device for processing a beacon are provided. The method includes receiving identification information of a beacon signal from a beacon transmitter in a geo-fence; comparing the received identification information of the beacon signal with beacon link information stored in the electronic device; and executing, according to a result of the comparison, a predetermined function based on stored beacon link information corresponding to the identification information of the beacon signal.

18 Claims, 12 Drawing Sheets

Geo-Fence List Information (700)

| Geo-Fence Identifier | Latitude/Longitude | Radius |
|---|---|---|
| 1 | lat/long # | 2km |
| 2 | lat/long # | 2.5km |
| 3 | lat/long # | 1.8km |
| ⋮ | ⋮ | ⋮ |
| n | lat/long # | 4km |

Beacon Link Information (800)

| Geo-Fence Identifier | Becon Identifier | Type | Sub-Type | Parameter | Update |
|---|---|---|---|---|---|
| 1 | 94 d7 71 fA 61 01 | function | web | http://abc.com | 2014.01.12 |
| | 94 d7 71 fA 61 02 | function | app | com.abc/android.myapp | 2014.01.12 |
| | 94 d7 71 fA 61 03 | function | video | http://abc.com/myvideo.mp4 | 2014.01.12 |
| | 94 d7 71 fA 61 04 | function | sound | http://abc.com/mysound.mp3 | 2014.01.12 |
| | 94 d7 71 fA 61 05 | function | image | http://abc.com/myimage.jpg | 2014.01.12 |
| | 94 d7 71 fA 61 06 | function | e-book | http://abc.com/myebbok.jpg | 2014.01.12 |
| | : | : | : | : | : |
| 2 | 94 d7 71 fA 62 01 | location | lat/long # | 51.4769315,-0.00005107,18 | 2014.01.15 |
| | 94 d7 71 fA 62 02 | location | lat/long # | 51.4769315,-0.00005111,18 | 2014.01.15 |
| | 94 d7 71 fA 62 03 | location | venue | 1 | 2014.01.15 |
| | : | : | : | : | : |
| ..... | ..... | ..... | ..... | ..... | ..... |

FIG.8

Request Message

```
GET /getBeaconLinkInformation?gf=1 HTTP/1.1
Host beacon.abc.com
```

FIG.10

METHOD OF PROCESSING BEACON OF ELECTRONIC DEVICE AND ELECTRONIC DEVICE THEREOF

PRIORITY

This application claims priority under 35 U.S.C. §119(a) to a Korean Patent Application filed in the Korean Intellectual Property Office on Jul. 16, 2014 and assigned Serial No. 10-2014-0089852, the entire content of which is incorporated herein by reference.

BACKGROUND OF THE INVENTION

1. Field of the Invention

The present invention relates generally to a method for an electronic device to process a beacon, and an electronic device thereof, and more specifically to a method for executing a function based on a received beacon signal.

2. Description of the Related Art

Beacon wireless communication technology has been proposed as a replacement for Near Field Communication (NFC) as a short-range wireless communication technology. For example, a Bluetooth Low Energy (BLE) beacon that utilizes BLE has been commonly used in various fields, including marketing, purchasing, and automatic check-in, in addition to providing location information.

NFC has an effective communication range from approximately 4 cm to 20 cm, whereas the BLE beacon has an extended effective communication range from approximately 5 cm to 50 m. While, NFC requires each mobile communication terminal involved in NFC communications to install a separate chip, the BLE beacon is able to provide short-range wireless communication using a beacon when a terminal merely has a BLE recognition function Therefore, use of a BLE beacon is more economical than NFC. BLE beacons are also capable of providing wireless communication services even in a broad indoor space.

Herein a "mobile communication terminal" may be any of various types of electronic devices, such as a smart phone, a tablet Personal Computer (PC), or the like, and may transmit and/or receive a beacon signal, when a beacon application program is executed, or when a predetermined icon provided from the beacon application program is selected by a user.

For example, when a mobile communication terminal receives a beacon signal from a predetermined terminal (e.g., a beacon transmitter) installed in a place, the mobile communication terminal may extract a beacon identifier (i.e., identification information of the beacon signal), transmit the beacon identifier to a server of a remote place, receive location information corresponding to the beacon identifier from the server, and display the location information on a display screen.

TA beacon identifier is a unique identifier of a predetermined terminal that transmits the beacon signal, and the location information may be a latitude and a longitude corresponding to a location where the predetermined terminal is installed. The mobile communication terminal transmits a beacon identifier to the server every time a beacon signal is received, and repeatedly and continuously executes reception of corresponding location information from the server. Thus, communication traffic between the mobile communication terminal and the server is frequently generated.

In addition, a long amount of time may pass before the mobile terminal displays the location information. More specifically, during the process in which the mobile communication terminal transmits the beacon identifier to the server, a location of a user who uses the mobile communication terminal may be revealed. A revelation of such information may be a violation of privacy.

A geo-fence is a compound word that is formed from the term 'Geo', which is a prefix having a meaning that refers to Earth, soil, or the like, and 'fence', which refers to an enclosure. The dictionary definition is a virtual perimeter for a real-world geographic area.

The geo-fence may be generated arbitrarily by necessity (for example, to distribute promotion materials within a radius of 100 m based on a predetermined store), and a predetermined district may act as the geo-fence (e.g., a school zone around an elementary school, etc.).

A geo-fence may be utilized to provide location-based advertisements. For example, a real estate company that owns hundreds of shopping centers in the U.S. provides a service in which 27 open-air malls transmit advertisement information through a text message using a portable phone.

SUMMARY OF THE INVENTION

The present invention has been made to address at least the above-mentioned problems and/or disadvantages and to provide at least the advantages described below.

An aspect of the present invention is to provide a method for an electronic device to process a beacon and an electronic device thereof, so that various types of electronic devices, for example, a smart phone, a tablet Personal Computer (PC), or the like, may effectively execute a predetermined function corresponding to identification information of a beacon signal received in a geo-fence.

According to an aspect of the present invention, a method of an electronic device is provided. The method includes receiving identification information of a beacon signal from a beacon transmitter in a geo-fence; comparing the received identification information of the beacon signal with beacon link information stored in the electronic device; and executing, according to a result of the comparison, a predetermined function based on stored beacon link information corresponding to the identification information of the beacon signal.

According to an aspect of the present invention, an electronic device is provided. The device includes a communication module configured to receive, from a beacon transmitter in a geo-fence, identification information of a beacon signal; and a processor configured to compare the received identification information with beacon link information stored in the electronic device, and execute, according to a result of the comparison, a predetermined function based on beacon link information corresponding to the identification information of the beacon signal.

According to another aspect of the present invention, non-transitory computer-readable recording medium that stores a program that, when executed, performs a method, is provided. The method includes receiving identification information of a beacon signal from a beacon transmitter in a geo-fence; comparing the received identification information of the beacon signal with beacon link information stored in the electronic device; and executing, according to a result of the comparison, a predetermined function based on stored beacon link information corresponding to the identification information of the beacon signal.

BRIEF DESCRIPTION OF THE DRAWINGS

The above and other aspects, features, and advantages of the present invention will be more apparent from the following detailed description taken in conjunction with the accompanying drawings, in which:

FIG. 7 is a diagram illustrating geo-fence list information stored in an electronic device according to various embodiments of the present invention;

FIG. 8 is a diagram illustrating beacon link information stored in a server according to various embodiments of the present invention;

FIG. 10 is a diagram illustrating a request message according to various embodiments of the present invention;

DETAILED DESCRIPTION OF EMBODIMENTS OF THE PRESENT INVENTION

Figure 1:
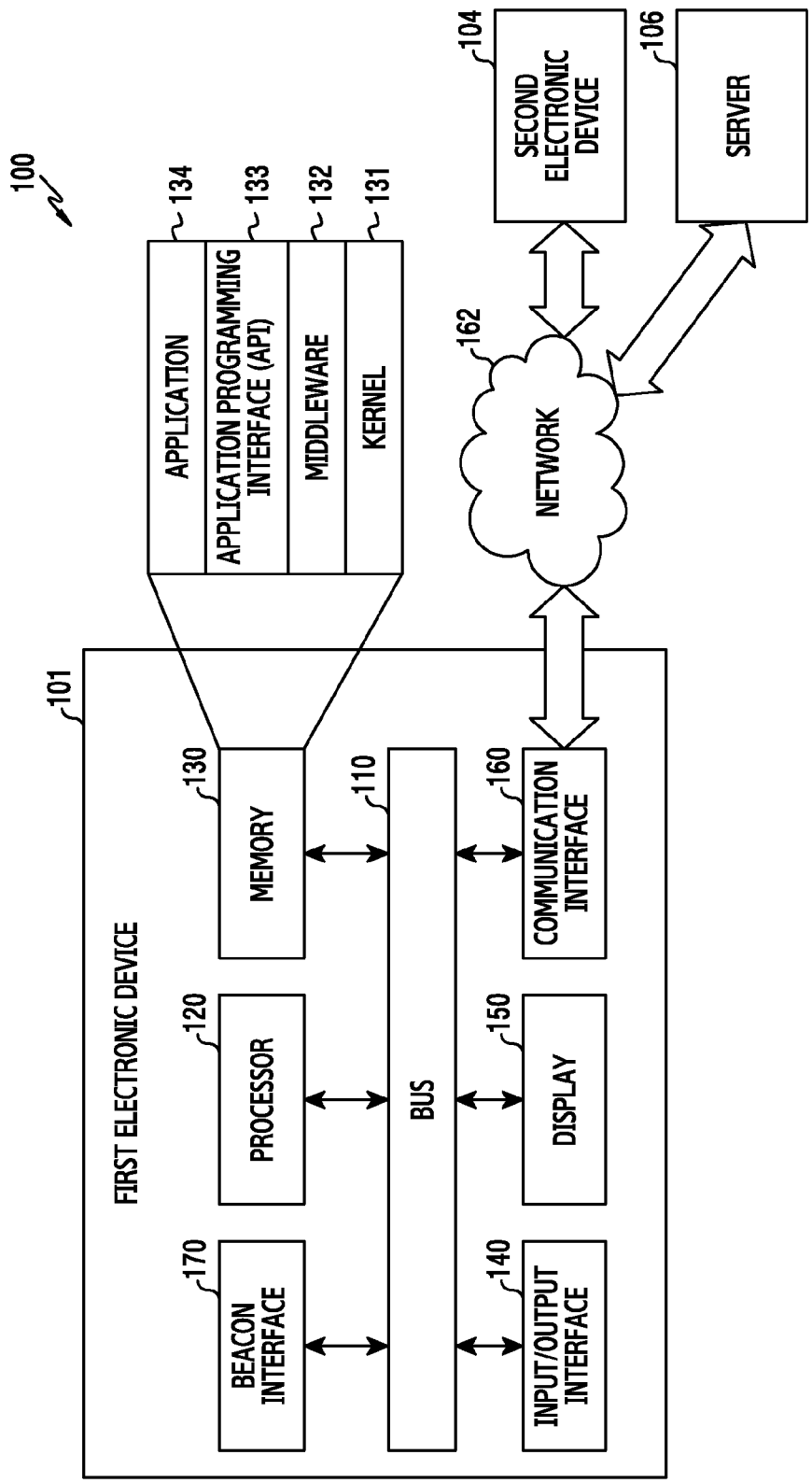
FIG. 1 is a diagram illustrating a network environment including an electronic device according to various embodiments of the present invention.

Hereinafter, various embodiments of the present invention are described with reference to the accompanying drawings. Various modifications and changes may be made to the embodiments described herein, in accordance with embodiments of the present invention. Therefore, embodiments of the present invention are described in detail herein with reference to particular embodiments shown in the accompanying drawings. However, the present invention should be construed to cover all modifications, equivalents, and alternatives falling within the spirit and scope of the various embodiments of invention. Throughout the drawings, identical or similar reference numerals may be used to designate identical or similar elements.

As used in various embodiments of the present invention, the expressions "include" or "may include" refer to the existence of a corresponding function, operation, or element, and does not exclude one or more additional functions, operations, or elements. Further, as used in various embodiments of the present invention, the terms "include", "have", and their conjugates are intended merely to denote a certain feature, numeral, step, operation, element, component, or a combination thereof, and do not preclude the existence of or a possibility of addition of one or more other features, numerals, steps, operations, elements, components, or combinations thereof. Further, as used with reference to various embodiments of the present invention herein, the expression "or" includes any or all combinations of words enumerated together. For example, the expression "A or B" may include either one of A and B, or may include both A and B.

Expressions including ordinal numbers, such as "first" and "second", as used in various embodiments of the present invention may modify various constituent elements, such constituent elements are not limited by the above expressions. For example, the above expressions do not limit the sequence and/or importance of the elements. The above expressions are used merely for the purpose of distinguishing an element from the other elements. For example, a first user device and a second user device indicate different user devices, since both devices are user devices. For example, a first element could be termed a second element, and similarly, a second element could be also termed a first element without departing from the scope of the present invention.

When an element is referred to as being "coupled" or "connected" to any other element, the element may be directly coupled or connected to the other element, but also a third element may be interposed therebetween. By contrast, when an element is referred to as being "directly coupled" or "directly connected" to any other element, is interposed therebetween.

The terms as used in various embodiments of the present invention are merely used for the purpose of describing particular embodiments and are not intended to limit the various embodiments of the present invention. As used herein, the singular forms of terms are intended to include the plural forms of these same terms as well, unless the context clearly indicates otherwise.

Unless defined otherwise, all terms used herein, including technical terms and scientific terms, have the same meanings as commonly understood by a person of ordinary skill in the art to which various embodiments of the present invention pertain. Such terms as those defined in a generally used dictionary are to be interpreted to have the meanings consistent with the contextual meanings in the relevant field of art, and are not to be interpreted to have ideal or excessively formal meanings unless clearly defined in various embodiments of the present invention.

An electronic device according to various embodiments of the present invention may be a device that includes a communication function. For example, an electronic device according to an embodiment of the present invention may include at least one of a smart phone, a tablet Personal Computer (PCs), a mobile phone, a video phone, an e-book reader, a desktop PC, a laptop PC, a netbook computer, a Personal Digital Assistant (PDA), a Portable Multimedia Player (PMP), a Motion Picture Experts Group (MPEG) audio Layer-3 (MP3) player, a mobile medical device, a camera, a wearable device (e.g., a Head-Mounted-Device (HMD), such as electronic glasses, electronic clothes, an electronic bracelet, an electronic necklace, an electronic appcessory, an electronic tattoo, or a smart watch).

According to some embodiments of the present invention, the electronic device may be a smart home appliance with a communication function. The smart home appliance as an example of the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments of the present invention, the electronic device may include any of various medical appliances (e.g., a Magnetic Resonance Angiography (MRA), Magnetic Resonance Imaging (MRI), Computed Tomography (CT), and ultrasonic machines), navigation equipment, a Global Positioning System (GPS) receiver, an Event Data Recorder (EDR), a Flight Data Recorder (FDR), an automotive infotainment device, electronic equipment for ships (e.g., ship navigation equipment and a gyrocompass), avionics, security equipment, a vehicle head unit, an industrial or home robot, an Automatic Teller Machine (ATM) of a banking system, and a Point Of Sale (POS) of a shop.

According to some embodiments of the present invention, an electronic device may include a part of furniture or a building/structure having a communication function, an electronic board, an electronic signature receiving device, a projector, and various kinds of measuring instruments (e.g., a water meter, an electric meter, a gas meter, a radio wave meter, etc.). The electronic device according to various embodiments of the present invention may be a combination of one or more of the aforementioned various devices. Further, the electronic device according to various embodiments of the present invention may be a flexible device. Further, it will be apparent to those skilled in the art that the electronic device according to various embodiments of the present invention is not limited to the aforementioned devices.

Hereinafter, electronic devices according to various embodiments of the present invention are described with reference to the accompanying drawings. Herein, the term "user", as used with respect to various embodiments of the present invention, indicates a user who uses an electronic device or a device that uses an electronic device, such as an artificial intelligence electronic device.

FIG. 1 illustrates a network environment 100 including a first electronic device 101 according to various embodiments of the present invention; Referring to FIG. 1, the first electronic device 101 includes a bus 110, a processor 120, a memory 130, an input/output interface 140, a display 150, a communication interface 160, and a beacon interface 170.

The beacon interface 170 is a component element for transmitting and/or receiving a beacon signal, which may be included in the communication interface 160 or may be a separate entity. The beacon interface 170 may work together with the processor 120. The bus 110 is a circuit for connecting the aforementioned component elements and transmitting communication (e.g., a control message) between the aforementioned component elements.

The processor 120 receives instructions from the aforementioned other component elements (e.g., the memory 130, the input/output interface 140, the display 150, the communication interface 160, etc.) through, for example, the bus 110, deciphers the received instructions, and performs calculation or data processing based on the deciphered instructions.

The memory 130 stores instructions or data received from or created by the processor 120 or other component elements (e.g., the input/output interface 140, the display 150, and the communication interface 160). The memory 130 includes programming modules, for example, a kernel 131, middleware 132, an Application Programming Interface (API) 133, applications 134, etc. The aforementioned programming modules may be formed of software, firmware, hardware, or a combination thereof.

The kernel 131 controls or manages system resources (for example, the bus 110, the processor 120, the memory 130, or the like) used for executing an operation or a function implemented in the remaining other programming modules of the first electronic device 101, for example, the middleware 132, the API 133, or the applications 134. In addition, the kernel 131 provides an interface through which the middleware 132, the API 133, or the application 134 may control or manage the individual component elements of the first electronic device 101 while accessing the individual component elements.

The middleware 132 perform a relay function of allowing the API 133 or the application 134 to communicate with the kernel 131 to exchange data therewith. Furthermore, in regard to task requests received from the applications 134, the middleware 132 may perform control (e.g., scheduling or load balancing) for the task requests, using a method, such as allocating at least one of the applications 134 a priority for using the system resources (for example, the bus 110, the processor 120, the memory 130, or the like) of the first electronic device 101.

The API 133 is an interface through which the applications 134 control functions provided by the kernel 131 or the middleware 132, and include at least one interface or function (e.g., instruction) for file control, window control, image processing, text control, etc.

According to the various embodiments of the present invention, the applications 134 include applications, such as a Short Message Service (SMS)/Multimedia Message Service (MMS) application, an e-mail application, a calendar application, an alarm application, a health care application (e.g., an application for measuring a quantity of exercise, blood sugar, etc.), an environment information application (for example, an application for providing atmospheric pressure, humidity, or temperature information), or the like. In addition or as an alternative to the above-identified applications, the applications 134 may include an application related to exchanging information between the first electronic device 101 and an external electronic device (e.g., a second electronic device 104). An application related to exchanging information may include, for example, a notification relay application for transferring particular pieces of information to an external electronic device or a device management application for managing the external electronic device.

For example, the notification relay application may include a function of transferring, to the external electronic device (e.g., the second electronic device 104), notification information generated from other applications of the first electronic device 101 (e.g., an SMS/MMS application, an e-mail application, a health management application, an environmental information application, and the like). In addition or as an alternative to the above-described applications, a notification relay application may be provided to receive notification information from, for example, the external electronic device (e.g., the second electronic device 104) and provide the received notification information to a user. For example, the device management application may manage (e.g., install, delete, or update) functions of at least a part of an external electronic device (e.g., the second electronic device 104) communicating with the first electronic device 101 (e.g., turning on/off the external electronic device itself (or some elements thereof) or adjusting brightness (or resolution) of a display), applications operating in the external electronic device, or services (for example, a telephone call service or a message service) provided from the external electronic device.

According to various embodiments of the present invention, the applications 134 include an application designated according to a property (e.g., a type) of the external electronic device (e.g., a type of the second electronic device 104). For example, when the external electronic device is an MP3 player, the applications 134 may include an application related to the reproduction of music. Similarly, when the external electronic device is a mobile medical appliance, the applications 134 may include an application related to health care. According to an embodiment of the present invention, the applications 134 may include an application designated to the first electronic device 101 and an application received from a source external to electronic device (e.g., a server 106 or the second electronic device 104).

The input/output interface 140 transfers instructions or data input from a user through an input/output device (e.g., a sensor, a keyboard, or a touch screen) to the processor 120, the memory 130, and the communication interface 160 through, for example, the bus 110. For example, the input/output interface 140 provides, to the processor 120, data for a user's touch input through a touch screen (not shown). In addition, through the input/output device (e.g., a speaker or a display), the input/output interface 140 may output instructions or data received from the processor 120, the memory 130, or the communication interface 160 through, for example, the bus 110. For example, the input/output interface 140 may output voice data, processed through the processor 120, to a user through a speaker.

The display 150 displays various pieces of information (for example, multimedia data or text data) to a user. The communication interface 160 connects communications between the first electronic device 101 and an external electronic device (e.g., the second electronic device 104 or the server 106). For example, the communication interface 160 may be connected to a network 162 through wireless or wired communication to communicate with the external device. Wireless communication may include, for example, Wi-Fi, BlueTooth (BT), Near Field Communication (NFC), Global Positioning System (GPS), and cellular communication (for example, Long-Term Evolution (LTE), LTE-Advanced (LTE-A), Code Division Multiple Access (CDMA), Wireless CDMA (WCDMA), Universal Mobile Telecommunications Service (UMTS), Wireless Broadband (WiBro), or Global System for Mobile Communications (GSM)). Wired communications may include, for example, Universal Serial Bus (USB), High Definition Multimedia Interface (HDMI), Recommended Standard 232 (RS-232), and Plain Old Telephone Service (POTS).

According to an embodiment of the present invention, the network 162 is a telecommunication network. The communication network may include a computer network, the Internet, the Internet of things, and a telephone network. According to an embodiment of the present invention, at least one of the applications 134, the application programming interface 133, the middleware 132, the kernel 131, and the communication interface 160 may support a protocol (for example, transport layer protocol, data link layer protocol, or physical layer protocol) for communication between the first electronic device 101 and an external device.

Figure 2:
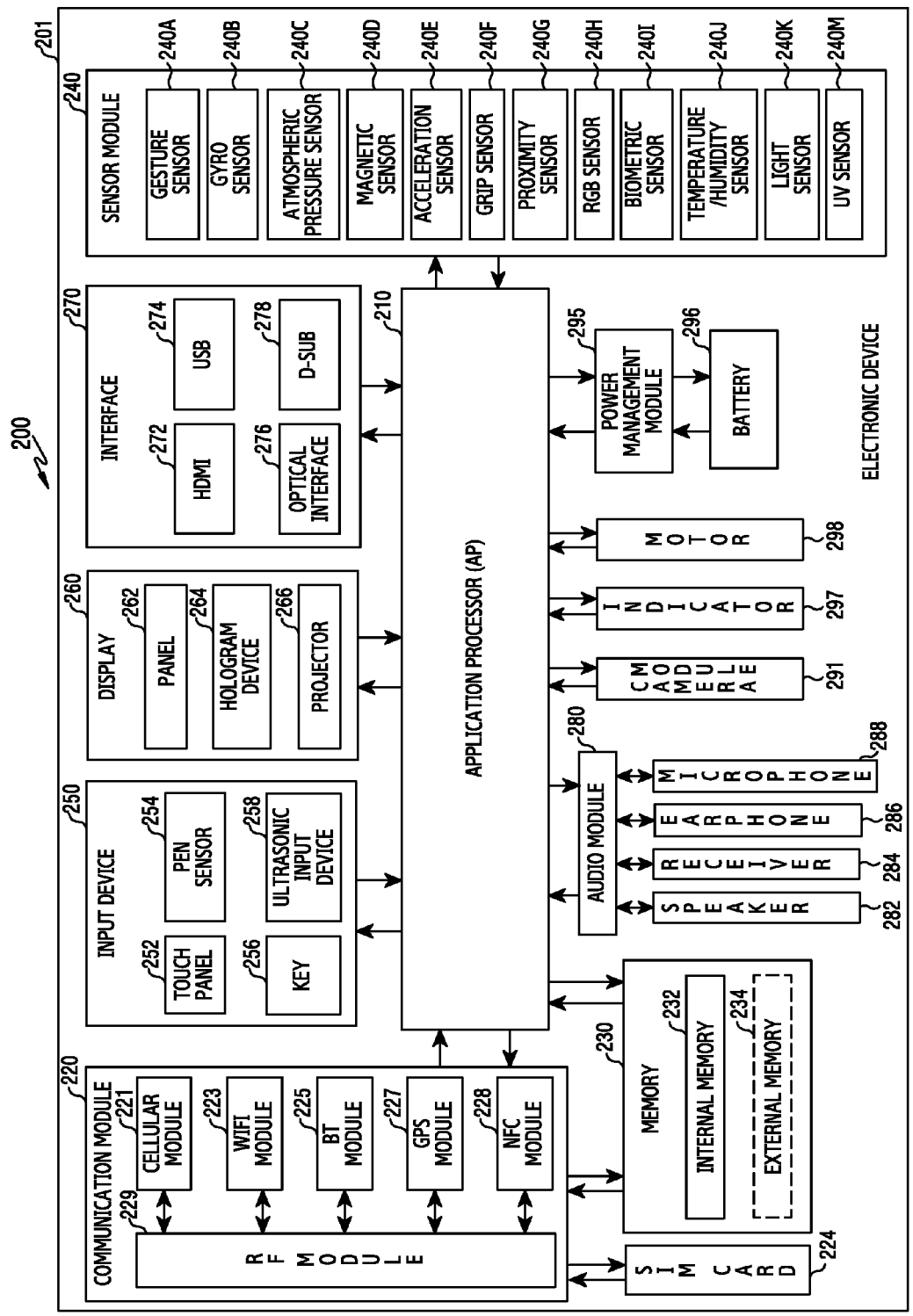
FIG. 2 is a block diagram of an electronic device according to various embodiments of the present invention.

FIG. 2 is a block diagram of an electronic device 201 according to various embodiments of the present invention. The configuration of electronic device 201 may be a configuration of, for example, all or a part of the first electronic device 101 illustrated in FIG. 1. Referring to FIG. 2, the electronic device 201 includes at least one Application Processor (AP) 210, a communication module 220, a Subscriber Identifier Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls a plurality of hardware or software component elements connected to the AP 210 by driving an operating system or an application program , and executes data processing and calculation associated with various types of data including multimedia data. The AP 210 may be embodied as, for example, a System on Chip (SoC). According to an embodiment of the present invention, the AP 210 may further include a Graphic Processing Unit (GPU), not illustrated.

The communication module 220 (e.g., the communication interface 160) performs data transmission/reception in communication between the electronic device 201 (e.g., the first electronic device 101) and other electronic devices (e.g., the second electronic device 104 and the server 106) connected over a network. According to an embodiment of the present invention, the communication module 220 includes a cellular module 221, a Wi-Fi module 223, a BT module 225, a GPS module 227, an NFC module 228, and a Radio Frequency (RF) module 229.

The cellular module 221 may provide voice calls, video calls, a text message service, or an Internet service through a communication network (e.g., LTE, LTE-A, CDMA, WCDMA, UMTS, WiBro, GSM, etc/). Furthermore, the cellular module 221 distinguishes between and authenticates electronic devices within a communication network by using, for example, a subscriber identification module (e.g., the SIM card 224). According to an embodiment of the present invention, the cellular module 221 performs at least some functions provided by the AP 210 may provide. For example, the cellular module 221 may perform at least some of the multimedia control functions. According to an embodiment of the present invention, the cellular module 221 includes a Communication Processor (CP). Furthermore, the cellular module 221 may be embodied as, for example, an SoC. Although the component elements such as the cellular module 221 (for example, a communication processor), the memory 230, the power management module 295 and the like are illustrated as separate component elements from the AP 210 in FIG. 2, the AP 210 includes at least some of the aforementioned component elements (e.g., the cellular module 221) according to an embodiment of the present invention.

According to an embodiment of the present invention, the AP 210 or the cellular module 221 (e.g., a communication processor) may load, into a volatile memory, an instruction or data received from at least one of a non-volatile memory or other component elements connected thereto and process the loaded instruction or data. Furthermore, the AP 210 or the cellular module 221 stores data received from or generated by at least one of other component elements in a non-volatile memory.

Each of the Wi-Fi module 223, the BT module 225, the GPS module 227, and the NFC module 228 may include, for example, a processor for processing data transmitted or received through a corresponding module. Although FIG. 2 illustrates each of the cellular module 221, the Wi-Fi module 223, the BT module 225, the GPS module 227, and the NFC module 228 as separate blocks, two or more of the cellular module 221, the Wi-Fi module 223, the BT module 225, the GPS module 227, and the NFC module 228 may be included in one integrated chip (IC) or one IC package, according to an embodiment of the present invention. For example, some of the processors corresponding respectively to the cellular module 221, the Wi-Fi module 223, the BT module 225, the GPS module 227, and the NFC module 228 (e.g., a CP corresponding to the cellular module 221 and a Wi-Fi processor corresponding to the Wi-Fi module 223) may be embodied as one SoC.

The RF module 229 transmits/receives data, such as, an RF Signal, for example. Although not illustrated, the RF module 229 may include, for example, a transceiver, a Power Amp Module (PAM), a frequency filter, a Low Noise Amplifier (LNA), or the like. The RF module 229 may further include a component for transmitting and receiving electromagnetic waves in a free space in a wireless communication system. The transmitting/receiving component may include, for example, a conductor, a conductive wire, or the like. Although FIG. 2 illustrates the cellular module 221, the Wi-Fi module 223, the BT module 225, the GPS module 227, and the NFC module 228 as sharing a single RF module 229, at least one of the cellular module 221, the Wi-Fi module 223, the BT module 225, the GPS module 227, and the NFC module 228 may transmit/receive a RF signal through a separate RF module according to an embodiment of the present invention.

The SIM card 224 may be inserted into a slot formed in a particular portion of an electronic device. The SIM card 224 includes unique identification information (for example, an Integrated Circuit Card IDentifier (ICCID)) or subscriber information (for example, an International Mobile Subscriber IDentity (IMSI)). The memory 230 (e.g., the memory 130) include an embedded memory 232 or an external memory 234. The embedded memory 232 may include a volatile memory (e.g., a Dynamic Random Access Memory (DRAM), a Static RAM (SRAM), a Synchronous Dynamic RAM (SDRAM), etc.) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, etc.).

According to an embodiment of the present invention, the embedded memory 232 may be a Solid State Drive (SSD). The external memory 234 may further include a flash drive (e.g., a Compact Flash (CF), a Secure Digital (SD), a Micro Secure Digital (Micro-SD), a Mini Secure Digital (Mini-SD), an eXtreme Digital (xD), a memory stick, etc.). The external memory 234 is functionally connected to the electronic device 201 through various interfaces. According to an embodiment of the present invention, the electronic device 201 may further include a storage device (or a storage medium) such as a hard disc drive.

The sensor module 240 measures physical quantities or detects operation state of the electronic device 201, and converts the measured or detected information to an electric signal. The sensor module 240 includes, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a biometric sensor 240I, a temperature/humidity sensor 240J, a light sensor 240K, and an Ultra-Violet (UV) sensor 240M. In addition or as an alternative to the above-described modules, the sensor module 240 may include (not shown), for example, an E-nose sensor, an ElectroMyoGraphy (EMG) sensor, an ElectroEncephaloGram (EEG) sensor, an electrocardiogram (ECG) sensor, an InfraRed (IR) sensor, an iris sensor, a fingerprint sensor (not illustrated), a geomagnetic sensor, and a heart rate monitor. The sensor module 240 may further include a control circuit for controlling one or more sensors included therein.

The input device 250 includes a touch panel 252, a (digital) pen sensor 254, a key 256, or an ultrasonic input device 258. The touch panel 252 detects a touch input through at least one scheme from among a capacitive scheme, a resistive scheme, an infrared scheme panel, and an ultrasonic scheme. Further, the touch panel 252 may includes a control circuit. The capacitive scheme detects a physical contact or proximity.

The touch panel 252 may further include a tactile layer. In this event, the touch panel 252 provides a tactile response to a user.

The (digital) pen sensor 254 may be implemented, for example, using a method identical or similar to a method for receiving a user's touch input or by using a separate recognition sheet. The key 256 may include, for example, a physical button, an optical key, or a keypad. The ultrasonic input unit 258 identifies data by detecting a sonic wave through a microphone (e.g., the microphone 288) in the electronic device 201, and may be capable of wireless recognition. According to an embodiment of the present invention, the electronic device 201 receives a user input from an external device (e.g., a computer or a server) connected thereto using the communication module 220.

The display 260 (e.g., the display 150) includes a panel 262, a hologram device 264, or a projector 266. The panel 262 may be, for example, a Liquid Crystal Display (LCD), an Active Matrix Organic Light Emitting Diode (AM-OLED), or the like. The panel 262 may be, for example, flexible, transparent, or wearable. The panel 262 may be integrated with the touch panel 252 as a single module. The hologram device 264 shows a stereoscopic image in the air using interference of light. The projector 266 may project light onto a screen to display an image. The screen may be located, for example, inside or outside the electronic device 201. According to an embodiment of the present invention, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 160 of FIG. 1. In addition or as an alternative to the above-described interfaces, the interface 270 may include a Mobile High-definition Link (MHL) interface, a Secure Digital (SD) card/Multi-Media Card (MMC) interface or an Infrared Data Association (IrDA) standard interface.

The audio module 280 bilaterally converts sound and electric signals. At least some component elements of the audio module 280 may be included in, for example, the input/output interface 140 illustrated in FIG. 1. The audio module 280 processes sound information input or output through, for example, a speaker 282, a receiver 284, earphones 286, the microphone 288, or the like.

The camera module 291 is a device that captures still and moving images, and according to an embodiment of the present invention, may include one or more image sensors (for example, a front sensor or a rear sensor), a lens, an Image Signal Processor (ISP), or a flash (for example, an LED or a xenon lamp). The power management module 295 manages the power of the electronic device 201. Although not illustrated, the power management module 295 may include, for example, a Power Management Integrated Circuit (PMIC), a charger Integrated Circuit (IC), or a battery or fuel gauge.

The PMIC may be mounted, for example, in integrated circuits or SoC semiconductors. The charging methods may be classified into wired charging and wireless charging. The charger IC may charge a battery and prevent an inflow of excessive voltage or excessive current from a charger. According to an embodiment of the present invention, the charger IC may include a charger IC for at least one of the wired charging type or the wireless charging type. Examples of wireless charging may include magnetic resonance charging, magnetic induction charging, and electromagnetic charging, and the like, and an additional circuit such as a coil loop, a resonance circuit, and a rectifier may be added for the wireless charging.

The battery gauge may measure, for example, a residual quantity of the battery 296, or a voltage, a current, or a temperature during the charging. The battery 296 stores or generates electricity and supplies power to the electronic device 201 by using the stored or generated electricity. The battery 296 may include, for example, a rechargeable battery or a solar battery.

The indicator 297 displays a specific status of the electronic device 201 or the part (for example, the AP 210) of electronic device 201, for example, a boot-up status, a message status, a charging status, and the like. The motor 298 converts an electrical signal into mechanical vibration. Although not illustrated, the electronic device 201 includes a processing device (for example, a GPU) for supporting mobile TV. The processing device for supporting mobile TV may process media data according to a standard of Digital Multimedia Broadcasting (DMB), Digital Video Broadcasting (DVB), media flow or the like.

Each of the above described elements of the electronic device according to various embodiments of the present invention may be formed of one or more components, and the name of a corresponding element may vary according to the type of an electronic device. An electronic device according to various embodiments of the present invention may include any of the above-described elements and may exclude some of the above-described elements, or further include other additional elements. Further, some of the elements of the electronic device according to various embodiments of the present invention may be coupled to form a single entity while performing the same functions as those of the corresponding elements before the coupling.

Hereinafter, a method for an electronic device to process a beacon and an electronic device thereof according to various embodiments of the present invention, is described in detail. An electronic device according to various embodiments of the present invention may be any various types of electronic devices, such as a smart phone, a tablet Personal Computer (PC), or the like, and may be configured to include component elements of FIGS. 1 and 2.

Figure 3:
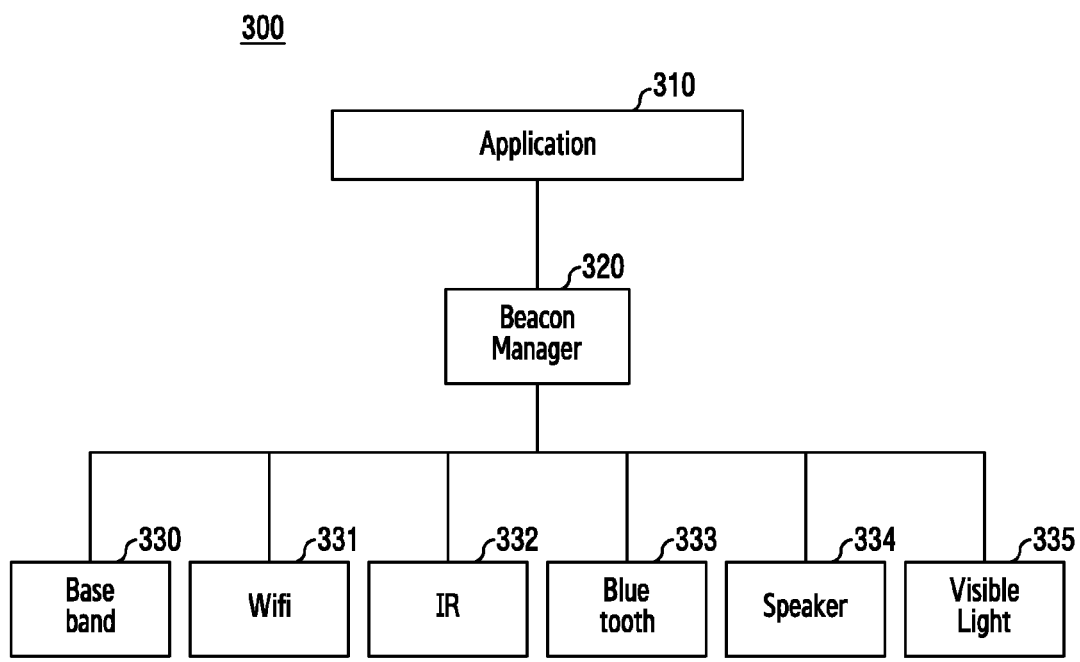
FIG. 3 is a block diagram of a partial configuration of an electronic device according to various embodiments of the present invention.

FIG. 3 is a block diagram of a partial configuration of an electronic device according to various embodiments of the present invention.

Referring to FIG. 3, an electronic device 300 includes an application 310, a beacon manager 320, a baseband module 330, a WiFi module 331, an infrared module 332, a Bluetooth module 333, a speaker 334, and the like, and may further include a visible light module 335 that communicates using a visible light (for example, a Light Emitting Diode (LED) light).

The beacon manager 320 may drive a beacon receiver, for example, as the application 310 begins execution. The beacon receiver may be one or more of the baseband module 330, the WiFi module 331, the infrared module 332, the Bluetooth module 333, the speaker 334, and the visible light module 335, or may be a separate entity. The beacon receiver outputs, to the beacon manager 320, a beacon signal received through wireless communication.

The beacon manager 320 may control transmission and/or reception of a beacon signal by working in conjunction with the application 310, or may directly generate a beacon signal. The beacon manager 320 may be included in one or more applications and manage a beacon operation for each application, or may exist outside the applications and manage beacon operations of various applications. In addition, the beacon manager 320 may be included in each of the baseband module 330, the WiFi module 331, the infrared module 332, the Bluetooth module 333, the speaker 334, the visible light module 335, and the like. In addition, the beacon manager 320 may work together with the processor 120 of FIG. 1, or may be included in the processor 120 of FIG. 1.

Based on a control command generated by the beacon manager 320, transmission and reception of a beacon signal may be controlled. Through a module that is capable of transmitting and receiving a beacon signal, a beacon signal may be transmitted or received. The baseband module 330, for example, may transmit or receive a beacon signal that is appropriate for communication in a mobile network such as GSM, UMTS, LTE, and the like. Meanwhile, the WiFi module 331 may transmit and receive a beacon signal that is appropriate for 802.11 communication standards.

The IR module 332 may transmit and receive a beacon signal using an infrared sensor. The Bluetooth module 333 may transmit and receive a beacon signal appropriate for Bluetooth communication standards. The speaker 334 may transmit and receive a signal through audible or inaudible sound, and may transmit and receive a beacon signal that includes predetermined information via audible or inaudible sound. In addition to the above mentioned modules, a beacon signal may be transmitted and received through various modules. The modules 330-335 may both transmit and receive beacon signals, or only transmit or receive a beacon signal.

Figure 4:
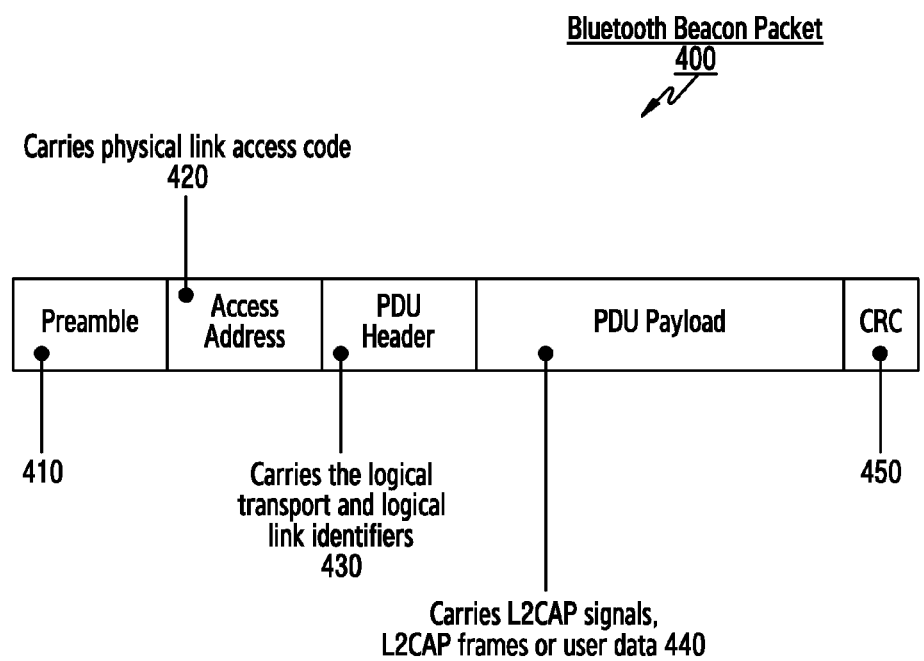
FIG. 4 is a diagram illustrating a configuration of a beacon packet according to various embodiments of the present invention.

FIG. 4 is a diagram illustrating a configuration of a beacon packet to which various embodiments of the present invention are applied.

Referring to FIG. 4, a beacon packet 400 includes, for example, a preamble 410, an access address 420, a Packet Data Unit (PDU) header 430, a PDU payload 440, and a Cyclical Redundancy Check (CRC) 450.

The preamble 410 includes, for example, information associated with frequency synchronization, symbol timing estimation, and automatic gain control. The access address 420 includes, for example, information associated with a physical link access code. The PDU header 430 includes, for example, information associated with logical transport, and logical link identifiers.

The PDU payload 440 includes, for example, information associated with a Logical Link Control and Adaptation Protocol (L2CAP) signal, L2CAP frames, and user data. CRC 450 includes, for example, information associated with detection of data transmission error. The PDU payload 440 may further include unique identification information of a beacon signal, for example, a beacon IDentifier (ID) (for example, 94 d7 71 fA 61 01). The beacon ID may be linked to predetermined location information (e.g., latitude and longitude) of a beacon transmitter that transmits the beacon signal, or may be linked to predetermined function information (e.g., app execution), and may be included in another part, excluding the PDU payload 440.

Figure 5:
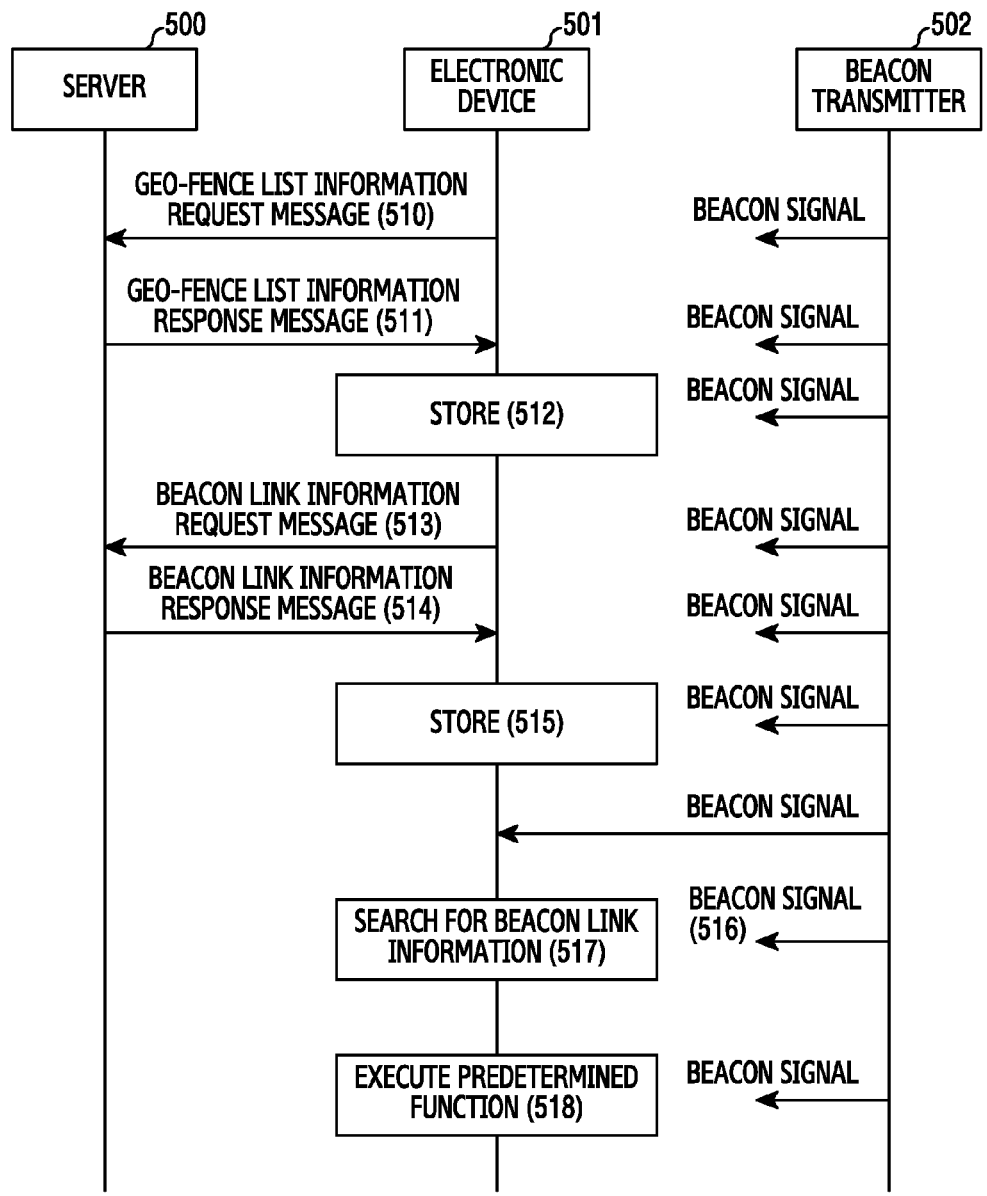
FIG. 5 is a flowchart illustrating operations of a beacon processing system according to various embodiments of the present invention.

FIG. 5 is a flowchart illustrating operations of a beacon processing system according to various embodiments of the present invention.

Referring to FIG. 5, a beacon processing system includes a server 500, an electronic device 501, a beacon transmitter 502, and the like.

When the electronic device 501 enters, for example, a new geo-fence (or enters an existing geo-fence a first time), the electronic device 501 generates a request message for requesting transmission of geo-fence list information, and transmits the request message to the server 500, in step 510.

In step 511, the server 500 generates a response message including the geo-fence list information in response to the request message, and transmits the response message to the electronic device 501. In step 512, the electronic device 501 receives the geo-fence list information transmitted from the server 500, and stores the same in a memory of the electronic device 501.

In step 513, the electronic device 501 generates a request message for requesting transmission of beacon link information, and transmits the request message to the server 500. In step 514, the server 500 generates a response message including the requested beacon link information, and transmits the response message to the electronic device 501, in response to the request message.

The electronic device 501 receives the beacon link information transmitted from the server 500, and stores the received beacon link information in the memory of the electronic device 501, in step 515. The beacon transmitter 502 is installed in, for example, a geo-fence, and periodically or occasionally transmits a beacon signal. In step 516, a beacon signal transmitted by the beacon transmitter 502 is received by the electronic device 501.

When the beacon signal is received, the electronic device 501 searches for beacon link information stored in the memory, in step 517. In step 518, the electronic device 501 may execute a predetermined function based on a result of the search for the beacon link information that matches the beacon signal.

For example, based on the beacon link information, the electronic device 501 may execute one or more predetermined functions from among executing a website (e.g., opening the website in a web browser), executing an app, executing a video (e.g., playing back the video), executing a sound (e.g., playing the sound), executing an image (e.g., displaying the image), and executing an e-book (e.g., displaying the e-book). The electronic device 501 may also execute a predetermined function, such as displaying location information of the electronic device or the beacon transmitter on a map image, or outputting video, audio, text, or the like. The above operations are described in further detail herein below.

Figure 6:
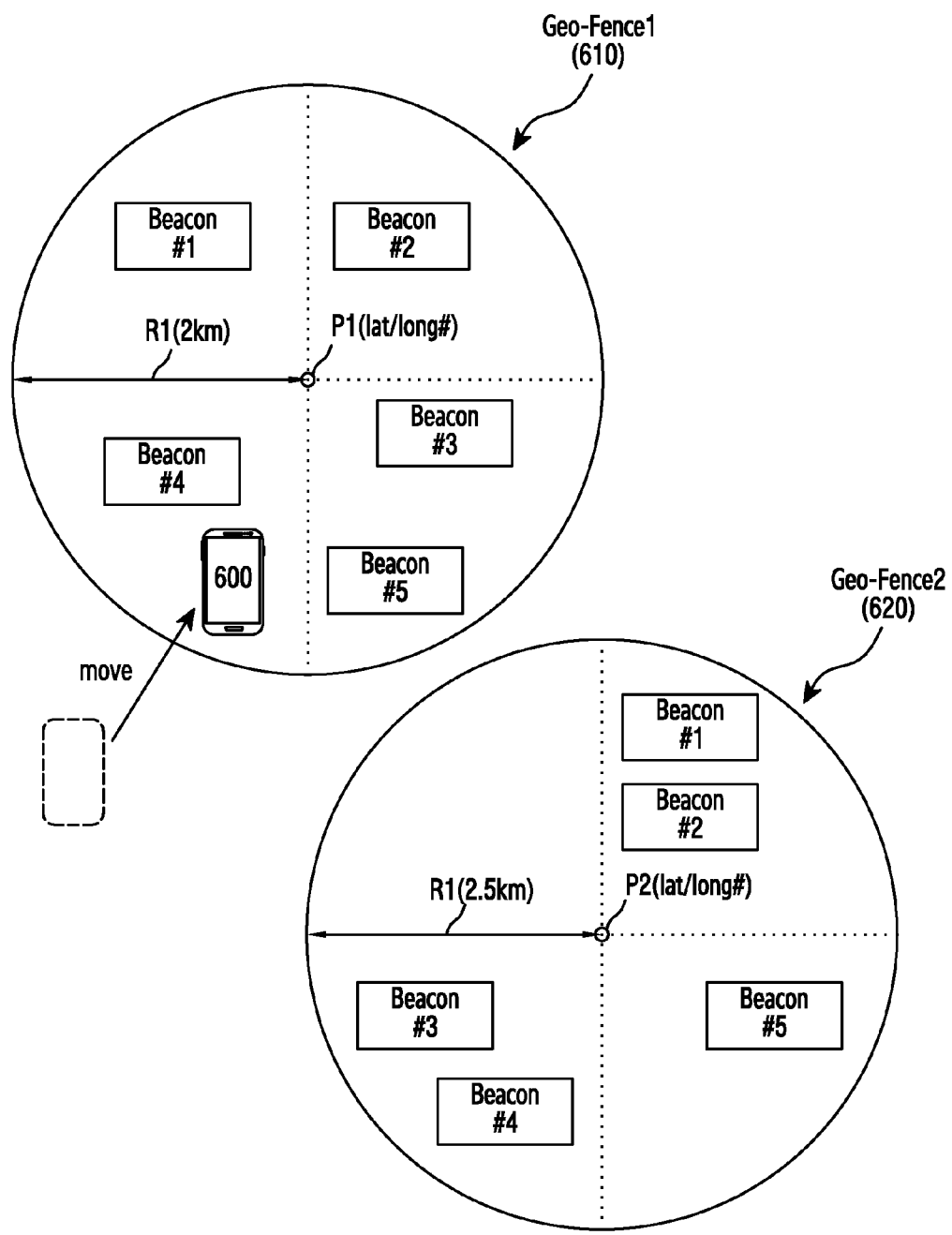
FIG. 6 is a diagram illustrating an example in which an electronic device enters a new geo-fence according to various embodiments of the present invention.

FIG. 6 is a diagram illustrating an example of a communication system in which an electronic device enters a new geo-fence according to various embodiments of the present invention.

Referring to FIG. 6, an electronic device 600 may be, for example, a mobile communication terminal, such as a smart phone, a tablet PC, or the like, and the electronic device 600 may move to various places and locations in accordance with movement of a user.

For example, as illustrated in FIG. 6, the electronic device 600, which has been located outside a first geo-fence designated based on a center point P1(lat/long#) and a radius R1 (e.g., 2 km) extending from the center point P1, and a second geo-fence designated based on a center point P2(lat/long#) and a radius R2 (for example, 2.5 km) extending from the second center point P2, may move and enter the first geo-fence 610, as a user moves, for example. The first geo-fence 610 may include one or more beacon transmitters. For example, first to fifth beacon transmitters Beacon#1 to Beacon#5 are located within the first geo-fence 610. Herein, "(lat/long#)" refers to a latitude/longitude value of a location, such as in the format "(latitude value, longitude value)".

When the electronic device 600 enters the first geo-fence 610, the processor 120 of the electronic device 600 searches for a geo-fence identifier, which is unique identification information assigned to the first geo-fence 610, from geo-fence list information stored in the memory 130 of the electronic device 600.

The processor 120 may download the geo-fence list information from the server and store the same in the memory 130, or may receive the geo-fence list information from an external device (e.g., a USB memory, a PC, or the like) connected through communication interface, such as a USB cable or the like, and store the geo-fence list in the memory 130.

FIG. 7 is a diagram illustrating geo-fence list information stored in an electronic device according to various embodiments of the present invention. Referring to FIG. 7, the geo-fence list information includes, for example, a geo-fence identifier that is unique identification information assigned to each geo-fence, a latitude/longitude value corresponding to a center point of each geo-fence, and a radius value that determines an area of a geo-fence based on a center point of each geo-fence, which are linked to one another and stored in the geo-fence list information 700 in the form of a list.

For example, as illustrated in FIG. 7, an $n^{th}$ geo-fence may be designated based on a unique serial number n assigned as an $n^{th}$ geo-fence identifier, a latitude/longitude value lat/long#=(51.4769315, −0.0005107, 18) corresponding to a center point of the $n^{th}$ geo-fence, and a radius of 4 km that determines an area based on the center point of the $n^{th}$ geo-fence.

The processor 120 of the electronic device 600 may control, for example, operations of the GPS module 227, so as to determine a latitude/longitude value corresponding to a current location of the electronic device, and determines that the electronic device enters a geo-fence included in the geo-fence list information when the determined latitude/longitude value is identical to a latitude/longitude value (or included in a range of latitude/longitude values) included in the geo-fence list information 700 (or when the determined latitude/longitude value is included within an error tolerance, set in advance, of a latitude/longitude value or a range of latitude longitude values included in the geo-fence list information 700).

Upon a determination that the electronic device has entered a new geo-fence (e.g., a first geo-fence listed in the geo-fence list information 700 of FIG. 7) through the above described process, the processor 120 of the electronic device transmits identification information (e.g., a unique serial number "1") of the new geo-fence to the server 106.

Subsequently, the processor 120 of the electronic device 600 receives beacon link information linked to the new geo-fence (e.g., the first geo-fence) from the server 106, and stores the received beacon link information in the memory 130. The beacon link information may be stored in the server 106 or a database that operates in conjunction with the server 106, which may be updated in various ways (e.g., big data). The database may be referred to by another name in accordance with embodiments of the present invention.

FIG. 8 is a diagram illustrating beacon link information stored in a server according to various embodiments of the present invention.

Referring to FIG. 8, beacon link information 800 may include, for example, a geo-fence identifier, a beacon identifier, a type, a sub-type, a parameter, update information, and the like in the form of a list, which are variously linked one another.

The geo-fence identifier includes a unique serial number (e.g., 1, 2, . . . , and n) assigned to each geo-fence, as illustrated in FIG. 7. One or more beacon identifier may be linked to each single geo-fence identifier. The beacon identifier, as illustrated with reference to FIG. 4, includes a unique ID (e.g., 94 d7 71 fA 61 01) assigned to a beacon transmitter. A type and a sub-type, which indicate a predetermined function or a predetermined location, are linked to the beacon identifier.

For example, as illustrated in FIG. 8, when the type corresponds to a function, a sub-type corresponding to the function type may include information for designating execution of at least one of a website open function, an app execution function, a video execution function, a sound execution function, an image execution function, and an e-book execution function.

When the type corresponds to a location, a sub-type that is linked to the location type may include information for designating a latitude/longitude (lat/long#) value or a venue. For example, as illustrated in FIG. 8, when the sub type corresponds to a website open function, a parameter linked to the sub-type stores website information (e.g., a Universal Resource Locator (URL) of a website, such as ABC.com).

When the sub type corresponds to an app execution function, a parameter linked to the sub-type may store app information (e.g., a URL of a page for obtaining app information at the website ABC.com).

When the sub-type corresponds to a latitude/longitude value, a parameter linked to the sub-type includes information (e.g., latitude/longitude=51.4769315, −0.0005107, 18) associated with a location where a corresponding beacon transmitter is installed or other such location information. When the sub-type corresponds to a venue, a parameter linked to the sub-type includes information associated with a place where a corresponding beacon transmitter is installed and other such information (e.g., a building identification number=1).

The update information is information associated with each piece of information. For example, the update information may include the latest updated date data (e.g., date information, such as "2014, 01, 12"). The update information may be used as reference information for the server or the electronic device or the like to determine whether the beacon link information is effective.

Figure 9:
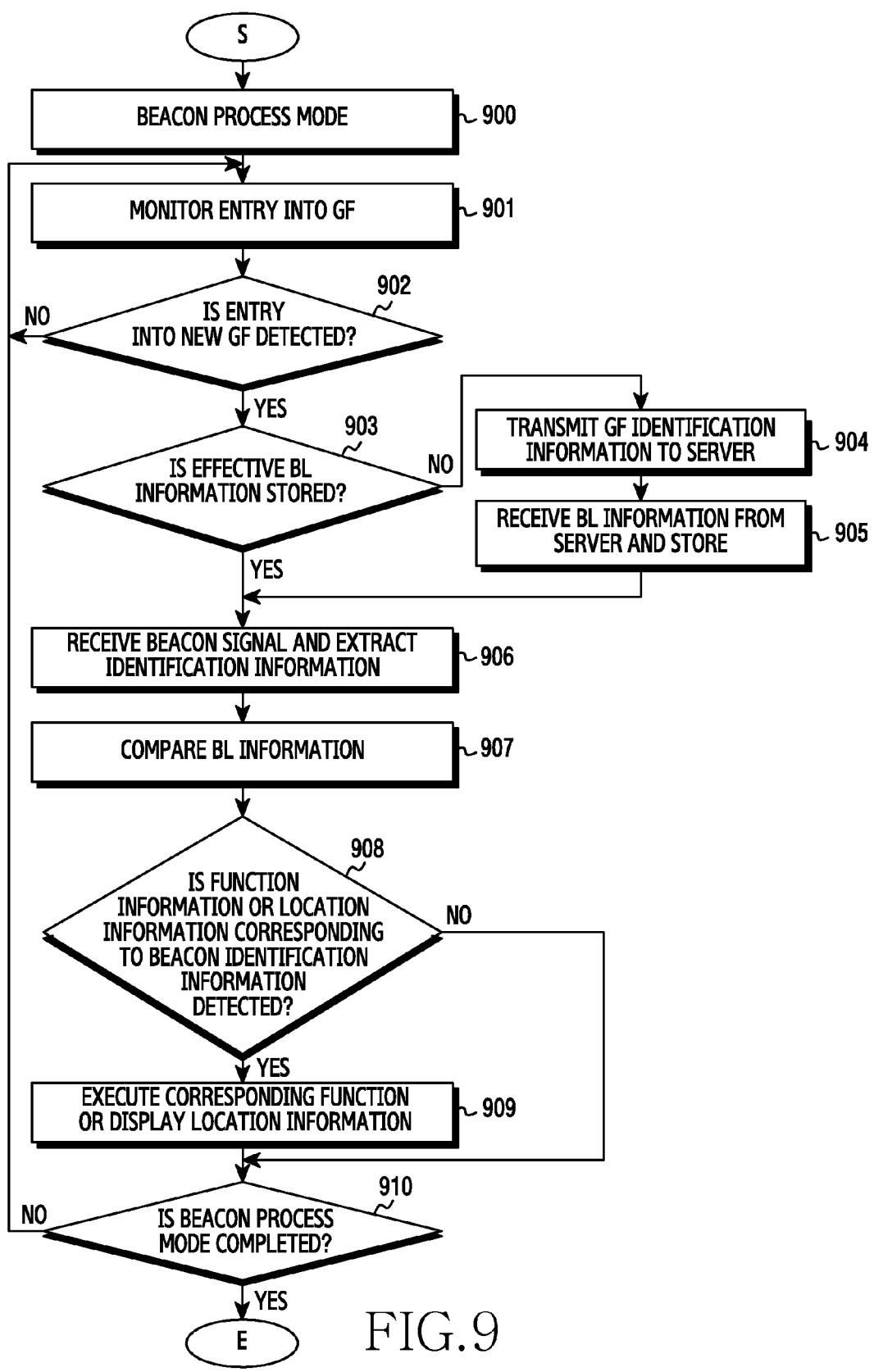
FIG. 9 is an operation flowchart illustrating a beacon processing method of an electronic device according to various embodiments of the present invention.

FIG. 9 is an operation flowchart illustrating a beacon processing method of an electronic device according to various embodiments of the present invention. Referring to FIG. 9, in step 900, the processor 120 of the electronic device sets a beacon process mode. The beacon process mode may be set or cancelled by, for example, a selection of a user, or may be automatically set or cancelled when the power of the electronic device is turned on or off.

In step 901, the processor 120 controls operations of the GPS module 227, so as to monitor whether the electronic device enters a new geo-fence (or enters a geo-fence for the first time). For example, the processor 120 compares a latitude/longitude value detected in real time by the GPS module 227, and geo-fence list information stored in the memory 130.

Through the comparison, when a latitude/longitude value that matches the latitude/longitude value detected by the GPS module 227 or is included in an error tolerance set in advance, is retrieved from the geo-fence list information, the electronic device 600 determines that the electronic device 600 is located within a geo-fence (for example, geo-fence 1) corresponding to the retrieved latitude/longitude value.

The latitude/longitude value corresponding to a current location of the electronic device 600 may be detected by the GPS module 227, or may be approximately estimated based on location information of a peripheral device that communicates with the electronic device, for example, an Access Point (AP) or the like.

When the processor 120 determines that the determined geo-fence is a new geo-fence where the electronic device enters according to a movement of the electronic device 600 or related information, in step 902, the processor 120 determines whether effective beacon link information corresponding to the new geo-fence (for example, geo-fence 1) is stored in the memory 130, in step 903.

When the determination of step 903 shows that the effective beacon link information corresponding to the new geo-fence is not stored in the memory 130, the processor 120 transmits, to the server 106, a geo-fence identifier, which is unique identification information assigned to the geo-fence, in step 904.

For example, the geo-fence identifier transmitted to the server 106 may be transmitted as a request message including a command that requests transmission of beacon link information. The request message may include, for example, an XML message (for example, GET/getBeaconLinkInformation?gf=1 HTTP/1.1)), which requests transmission of beacon link information associated with the first geo-fence, access information of the corresponding server 106 (e.g., Host:becon.abc.com), and the like, such as illustrated in FIG. 10.

In step 905, the processor 120 receives beacon link information corresponding to the geo-fence identifier from the server 106, and stores the received beacon link information in the memory 130. When the determination in step 903 shows that effective beacon link information corresponding to the new geo-fence is already stored in the memory 130, the processor 120 omits steps 904 and 905.

The processor 120 determines update information (e.g., date information, version information, etc.) of the beacon link information stored in the memory 130, or determines whether the beacon link information stored in the memory 130 is effective through communication with the server 106.

In step 906, the processor 120 controls operations of at least one of the baseband module 330, the WiFi module 331, the infrared module 332, the Bluetooth module 333, the speaker 334, and the visible module 335 so as to use the same as a beacon receiver, as described with reference to FIG. 3, receive a beacon signal, and extract beacon identification information included in the beacon signal.

For example, as described with reference to FIG. 4, the processor 120 may control operations of the Bluetooth module 333 so as to use the Bluetooth module 333 as a beacon receiver, receive a BLE beacon packet 400, and may extract a beacon identifier included in a PDU payload 440 of the BLE beacon packet 400.

In step 907, the processor 120 compares the extracted beacon identifier and the beacon link information stored in the memory 130. In step 908, the processor 120 executes a search so as to determine whether function information or location information corresponding to the beacon identifier is stored in the beacon link information.

In step 909, when at least one of function information and location information linked to the beacon identifier is retrieved as a result of the search, the processor 120 executes a predetermined function corresponding thereto. The location information may be output in various schemes, such as, video, audio, text, or the like.

Figure 11:
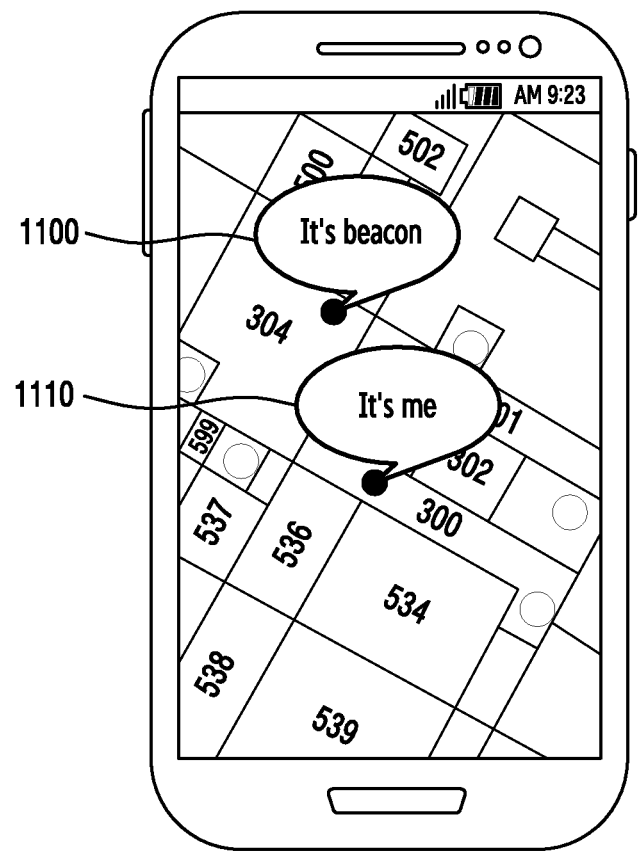
FIG. 11 is a diagram illustrating an example in which a map image is displayed in an electronic device according to various embodiments of the present invention.

In addition, the location information may be displayed on a map image that displays some or all of a corresponding geo-fence. For example, as illustrated in FIG. 11, a location 1100 of a predetermined terminal that transmits a beacon signal and a current location 1110 of the electronic device are displayed on the map image together or separately, in various schemes (for example, a word bubble or the like).

Figure 12:
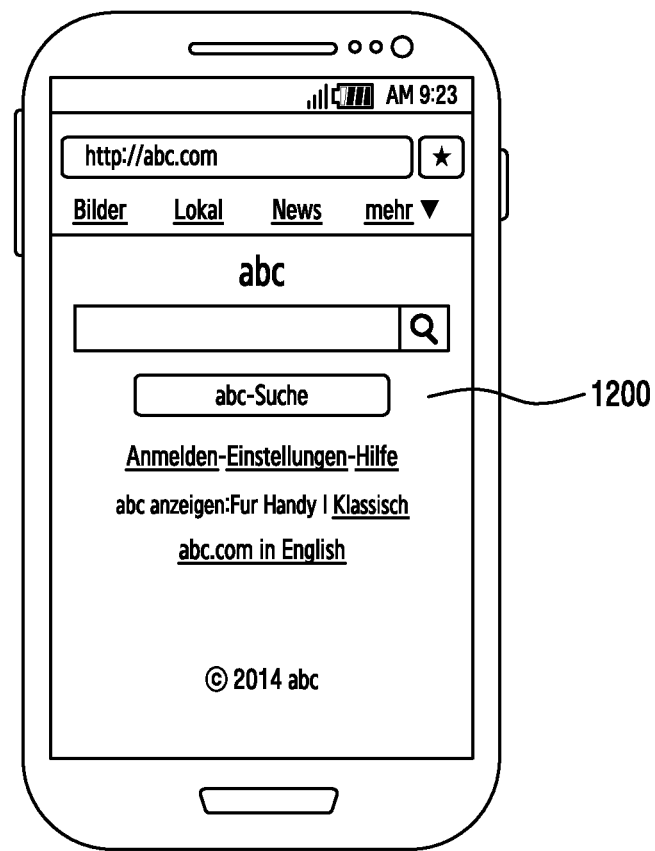
FIG. 12 is a diagram illustrating an example in which a website screen is displayed in an electronic device according to various embodiments of the present invention.

The processor 120 may execute various functions, such as, opening a predetermined website, executing a predetermined app, executing a predetermined video, executing a predetermined sound, executing a predetermined image, executing a predetermined e-book, and the like, based on function information linked to the beacon identifier. For example, as illustrated in FIG. 12, when the function information linked to the beacon identifier is function information corresponding to opening a website (e.g., ABC.com), the processor 120 may execute a predetermined function of accessing a corresponding Internet website, and thereby, a website screen 1200 may be displayed in the electronic device.

According to various embodiments of the present invention, various types of electronic devices, such as a smart phone, a tablet PC, or the like, promptly output predetermined location information corresponding to identification information of a beacon signal received from a beacon transmitter within a geo-fence, through video, audio, text, a map image, or the like, and may execute a predetermined function corresponding to the identification information of the beacon signal.

In addition, communication traffic between the electronic device and a server may be reduced. Furthermore, the location of a user who uses the electronic device may be prevented from being exposed, and thus, privacy of the user may be protected.

The methods according to various embodiments of the present invention may be implemented in the form of hardware, software, or any combination of hardware and software. In the implementation of software, a computer-readable storage medium (e.g., a non-transitory computer-readable storage medium) for storing one or more programs (i.e., software modules) may be provided. Programs stored in the computer-readable storage medium may be configured for execution by one or more processors within the electronic device. Programs may include instructions that cause the electronic device to perform the methods according to various embodiments of the present invention as defined by the appended claims or disclosed herein.

Programs (i.e., software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access a device for performing embodiments of the present invention via an external port. Further, a separate storage device on the communication network may access a device for performing embodiments of the present invention.

In various embodiments of the present invention as described above, an element or elements may be expressed in a singular form or plural form according to the presented embodiments. However, the singular form and plural forms are selected for convenience of description suitable for the presented situation, and various embodiments of the present invention are not limited to a single element or multiple elements thereof. Further, either multiple elements expressed in the description may be configured into a single element or a single element in the description may be configured into multiple elements.

While particular embodiments have been shown and described in the detailed description of various embodiments of the present invention, it will be apparent to those skilled in the art that various modifications and changes may be made therein without departing from the spirit and scope of various embodiments of the present invention. Therefore, the scope of the present invention is not limited to the embodiments described herein, but is defined by the appended claims and equivalents thereof.

What is claimed is:

1. A method of an electronic device, the method comprising:
   detecting entering a geo-fence;
   transmitting, in response to the detecting, a message for requesting beacon link information to a server for the geo-fence;
   receiving, from the server, the beacon link information comprising data regarding beacon transmitters located within the geo-fence, wherein the beacon link information comprises first data regarding identifiers (IDs) of the beacon transmitters and second data regarding services respectively associated with the IDs:
   receiving, from a beacon transmitter among the beacon transmitters, a beacon signal comprising an ID of the beacon transmitter; and
   providing, in response to identifying that the ID is included in the first data, a service associated with the ID based on the second data.

2. The method of claim 1, wherein the message comprises identification information regarding the geo-fence.

3. The method of claim 2, wherein detecting entering the geo-fence comprises comparing a location of the electronic device with geo-fence list information comprising data regarding a plurality of geo-fences comprising the geo-fence, and
   wherein the geo-fence list information comprises location information of the plurality of geo-fences and identification information of the plurality of geo-fences.

4. The method of claim 3, further comprising:
   transmitting, to the server, a message for requesting the geo-fence list information; and
   receiving, from the server, the geo-fence list information.

5. The method of claim 1, wherein the beacon link information further comprises third data regarding sources respectively associated with the IDs, and
   wherein the sources are used for providing the services.

6. The method of claim 5, wherein providing the service comprises:

determining, based on the third data, a source associated with the ID among the sources; and providing the service by using the source.

7. The method of claim 6, wherein each of the sources comprises an address of a webpage or at least one value indicating a location of each of the beacon transmitters.

8. The method of claim 7, wherein the at least one value comprises one or more of latitude or longitude.

9. The method of claim 1, wherein providing the service comprises displaying a content associated with the ID, and wherein the content comprises one or more of a webpage, map information, an e-book, an image, a user interface of an application, or a video.

10. An electronic device comprising:

one or more memories storing instructions;

a communication module; and one or more processors, operably coupled with the one or more memories and the communication module, configured to execute the stored instructions to:

detect entering a geo-fence;

transmit, in response to the detecting, a message for requesting beacon link information to a server for the geo-fence;

receive, from the server, the beacon link information comprising data regarding beacon transmitters located within the geo-fence, wherein the beacon link information comprises first data regarding identifiers (IDs) of the beacon transmitters and second data regarding services respectively associated with the IDs;

receive, from a beacon transmitter among the beacon transmitters, a beacon signal comprising an ID of the beacon transmitter; and provide, in response to identifying that the ID is included in the first data, a service associated with the ID based on the second data.

11. The electronic device of claim 10, wherein the message comprises identification information regarding the geo-fence.

12. The electronic device of claim 11, wherein the one or more processors are further configured to execute the stored instructions to:

detect entering the geo-fence by comparing a location of the electronic device with geo-fence list information comprising data regarding a plurality of geo-fences comprising the geo-fence, and wherein the geo-fence list information comprises location information of the plurality of geo-fences and identification information of the plurality of geo-fences.

13. The electronic device of claim 12, wherein the one or more processors are further configured to execute the stored instructions to:

transmit, to the server, a message for requesting the geo-fence list information; and receive, from the server, the geo-fence list information.

14. The electronic device of claim 10, wherein the beacon link information further comprises third data regarding sources respectively associated with the IDs, and wherein the sources are used for providing the services.

15. The electronic device of claim 14, wherein the one or more processors are further configured to execute the stored instructions to:

determine, based on the third data, a source associated with the ID among the sources; and provide the service by using the source.

16. The electronic device of claim 15, wherein each of the sources comprises an address of a webpage or at least one value indicating a location of each of the beacon transmitters.

17. The electronic device of claim 16, wherein the at least one value comprises one or more of latitude or longitude.

18. A non-transitory computer-readable recording medium that stores a program that, when executed, performs a method comprising:

detecting entering a geo-fence;

transmitting, in response to the detecting, a message for requesting beacon link information to a server for the geo-fence;

receiving, from the server, the beacon link information comprising data regarding beacon transmitters located within the geo-fence, wherein the beacon link information comprises first data regarding identifiers (IDs) of the beacon transmitters and second data regarding services respectively associated with the IDs;

receiving, from a beacon transmitter among the beacon transmitters, a beacon signal comprising an ID of the beacon transmitter; and providing, in response to identifying that the ID is included in the first data, a service associated with the ID based on the second data.

* * * * *